US008054798B2

(12) United States Patent
Jeong et al.

(10) Patent No.: US 8,054,798 B2
(45) Date of Patent: Nov. 8, 2011

(54) PROXY ACTIVE SCAN FOR WIRELESS NETWORKS

(75) Inventors: Moo Ryong Jeong, San Jose, CA (US); Fujio Watanabe, Sunnyvale, CA (US); Toshiro Kawahara, Saratoga, CA (US)

(73) Assignee: NTT DoCoMo, Inc., Tokyo (JP)

(*) Notice: Subject to any disclaimer, the term of this patent is extended or adjusted under 35 U.S.C. 154(b) by 1238 days.

(21) Appl. No.: 10/545,464

(22) PCT Filed: May 20, 2004

(86) PCT No.: PCT/US2004/016236
§ 371 (c)(1),
(2), (4) Date: Aug. 11, 2005

(87) PCT Pub. No.: WO2005/002116
PCT Pub. Date: Jan. 6, 2005

(65) Prior Publication Data
US 2006/0092888 A1 May 4, 2006

Related U.S. Application Data

(60) Provisional application No. 60/479,124, filed on Jun. 13, 2003.

(51) Int. Cl.
*H04W 4/00* (2009.01)
(52) U.S. Cl. .......................... 370/331; 370/338
(58) Field of Classification Search ................... 370/328
See application file for complete search history.

(56) References Cited

U.S. PATENT DOCUMENTS

| | | | |
|---|---|---|---|
| 6,216,004 B1 * | 4/2001 | Tiedemann et al. | 455/442 |
| 6,473,600 B1 | 10/2002 | Dvorkin | 455/129 |
| 6,985,465 B2 * | 1/2006 | Cervello et al. | 370/333 |
| 7,110,381 B1 * | 9/2006 | O'Sullivan et al. | 370/338 |
| 2002/0071448 A1 * | 6/2002 | Cervello et al. | 370/445 |
| 2003/0003912 A1 * | 1/2003 | Melpignano et al. | 455/436 |

OTHER PUBLICATIONS

Author Unknown, IEEE Standard 802.11-1997, Wireless LAN Medium Access Control and Physical Layer Specifications, Jun. 26, 1997.*

\* cited by examiner

*Primary Examiner* — Daniel J Ryman
*Assistant Examiner* — Christopher Crutchfield
(74) *Attorney, Agent, or Firm* — Haynes & Boone, LLP.

(57) ABSTRACT

Active scanning method in a wireless network for fast determining available access points (106, 806) using inter-AP (Access Point) communication is described. In the scanning method, a mobile station (102, 802) sends Probe Request for Proxy frame to the current AP (104, 804) serving the mobile station (102, 802). In response to the Probe Request for Proxy frame, the current AP (104, 804) send Proxy Probe Request packet to the appropriate APs (106, 806). In response to the Proxy Probe Request packet, the neighbor APs (106, 806) send Probe Response frame to the mobile station (102, 802) on its operating channel. Since the mobile station (102, 802) moves to the channel being examined after sending the Probe Request for Proxy frame, it receives the Probe Response frame if it is in the coverage area of the neighbor AP (106, 806). The content of Probe Response frame provides the mobile station (102, 802) with the information to be used in handoff decision and network join procedures. Thus, the mobile station (102, 802) neither has to move to the channel to be examined nor send Probe Request frame on that channel. This enables active scan to be initiated even when the neighbor AP (106, 806) is operating in PCF (Point Coordination Function) and the network is in CFP (Contention Free Period), during which unassociated mobile stations (including the scanning mobile station) cannot send packets.

31 Claims, 7 Drawing Sheets

PROXY ACTIVE SCAN FOR WIRELESS NETWORKS

RELATED APPLICATIONS

This application claims priority to U.S. Provisional Application Ser. No. 60/479,124, filed Jun. 13, 2003.

BACKGROUND

1. Field of the Invention

The present invention relates generally to wireless networks, and more particularly to scanning and establishing communications in a wireless local area network.

2. Related Art

In order for a mobile station to determine which network to join, the mobile station must first scan for available networks. Scanning can be passive or active. Passive scanning involves listening for beacon frames from APs (access points). Active scanning, on the other hand, involves the transmission of Probe Request frames for soliciting a Probe Response frame from access points in the area. Receiving a beacon frame (passive scanning) or a Probe Response frame (active scanning) from an access point allows the mobile station to learn the availability and/or the characteristics of the network that is coordinated by the access point. Scanning, either passive or active, can take place on one or more radio channels according to the number of radio channels available for the wireless network.

One of the significant problems of the conventional scanning methods is that they are not fast enough to prevent communication interruption during handoff. In case of IEEE 802.11 Wireless LAN, an empirical analysis of handoff process found that active scanning may have high latency of as much as 50 msec per channel. Details can be found in IEEE 802 Part 11: Wireless LAN Medium Access Control (MAC) and Physical Layer (PHY) specifications, *IEEE Standard 802.11*, 1999 and "An Empirical Analysis of the IEEE 802.11 MAC Layer Handoff Process," by Arunesh Mishra, Minho Shin, William Arbaugh, submitted to ACM CCR, both of which are incorporated by reference in their entirety. Passive scanning in IEEE 802.11 has an even higher latency since the mobile station must stay on each channel for at least one beacon interval, whose recommended value is 100 msec. A more detailed description can be found in Matthew S. Gast, "802.11 Wireless Networks—The Definitive Guide," O'Reilly, April 2002, which is incorporated by reference in its entirety. Large scanning time may contribute to TCP timeout, triggering TCP congestion avoidance algorithm, which results in decreased throughput. The large scanning time may also seriously deteriorate quality of voice service, since the maximum interruption time allowed for voice application is 50 msec (ideally, interruption time should be kept less than 35 msec).

This situation will be more aggravated if PCF (Point Coordination Function) is used in the APs to be scanned. If an AP is operating PCF, only an associated mobile station has the right to be added to the polling list, and during a CFP (Contention Free Period) only the mobile station in the polling list may access the wireless medium if polled by the AP. Since a mobile station in active scanning is not associated with the APs to be scanned, the mobile station cannot send Probe Request frames during the CFP. As a result, scanning latency is dramatically increased.

Therefore, a scanning method for wireless networks that has smaller latency is desired.

SUMMARY

In accordance with one aspect of the present invention, an active scanning method in a wireless network uses inter-AP (Access Point) communication for fast determining the available access points for a mobile station. In the scanning method, the mobile station sends a Probe Request for Proxy frame to the current AP serving the mobile station. In response to the Probe Request for Proxy frame, the current AP sends a Proxy Probe Request packet to the appropriate neighboring APs. In response to the Proxy Probe Request packet, the neighboring APs send Probe Response frames to the mobile station on its operating channel. Since the mobile station moves to the channel being examined after sending the Probe Request for Proxy frame, it receives the Probe Response frame if it is in the coverage area of the neighboring AP. The content of Probe Response frame provides the mobile station with the information to be used in handoff decision and network join procedures. Thus, communication between the mobile station and a neighboring AP is from the mobile station to the current AP to the neighboring AP to the mobile station, as opposed to Probe Request and Probe Response sent directly between the mobile station and neighboring AP as with conventional methods.

One advantage of the present invention is that the mobile station neither has to move to the channel to be examined nor has to send a Probe Request frame on that channel. This enables active scan to be initiated even when the neighboring AP is operating in PCF (Point Coordination Function) and the network is in CFP (Contention Free Period), during which unassociated mobile stations (including the scanning mobile station) cannot send packets.

In one embodiment, the mobile station selects a channel of interest, sends a Probe Request for Proxy frame to the current AP, and moves to the selected channel. The mobile station then determines if any Probe Response frame from a neighboring AP is received before a time period (MaxChannelTime) expires. If so, then the mobile station sends an ACK and processes each Probe Response frame received.

For the current AP, upon receipt of the Probe Request for Proxy frame, it examines the neighbor SSID field in the received Probe Request for Proxy frame. If the neighbor SSID field has a non-broadcast SSID, the current AP determines if it knows the IP address or addresses of the AP or APs that have the specified SSID and operates on the specified channel. If so, the current AP sends a Proxy Probe Request packet to the IP address of each known AP. Otherwise, the current AP sends a Proxy Probe Request packet to the IAPP multicast address for all APs in the DS operating on the specified channel. If the neighbor SSID field has a broadcast SSID, the current AP determines if the IP address is known for the APs that operate on the specified channel. If so, the current AP sends a Proxy Probe Request packet to the IP address of each known AP. Otherwise, the current AP sends the Proxy Probe Request to the IAPP multicast address.

Thus, if the current AP has the information on the IP address(es) of the AP(s) to be examined, then it can send the Proxy Probe Request packet(s) only to those AP(s) using, for example, TCP/IP protocol. Otherwise, it can multicast the packet on the entire DS using IAPP multicast so that every AP in the DS can receive and respond if it satisfies the conditions posed by channel, BSSID, and SSID fields.

For the neighboring AP, upon receipt of the Proxy Probe Request packet, the neighboring AP investigates the channel, BSSID, and SSID fields in the received packet. The neighboring AP responds to the Proxy Probe Request packet by sending a Probe Response frame to the mobile station only when channel, BSSID, and SSID information matches its own ones. This is why the current AP can multicast Proxy Probe Request frame on the entire DS when it has no information on the IP address of the APs which satisfies the condition posed by the three fields. The Probe Response frame is transmitted until an ACK is returned from the mobile station or the RetryLimit is reached. Thus, even when the mobile station moves to the operation channel of the AP later than the first transmission of the Probe Response frame, it can receive the retransmitted Probe Response frame. This eliminates the burden of synchronizing the mobile station's channel tuning activity and the neighbor AP's Probe Response frame.

An additional advantage of this embodiment is that basically all APs in the DS operating on the specified channel respond to the Probe Request for Proxy frame. Thus, the mobile station can obtain all the information on the neighboring APs in the DS and operating on the channel. Further, the Probe Response frame is delivered directly from the neighboring APs to the mobile station over the channel being examined. This allows the availability of the AP to be confirmed through actual frame exchanges.

According to another embodiment, the mobile station is interested in a specific neighboring AP and has the basic information on that AP. The information includes the BSSID and operation channel of the AP. The active scan procedure is similar to the active scan procedure in the above embodiment, except that the mobile station specifies in Probe Request for Proxy frame the specific AP to be examined. Only the specified AP responds, by sending on its operation channel a Probe Response frame to the mobile station. As a result, the mobile station does not have to stay on the channel after receiving a Probe Response frame and sending ACK to the frame. Since the mobile station can fast return to the current communication channel, scanning overhead is reduced and the fast handoff is facilitated.

As in the earlier embodiment, the mobile station in this embodiment does neither have to move to the channel to be examined nor have to send a Probe Request frame on that channel. This enables active scan to be done even when the neighbor AP is operating in PCF with long CFP. As in the earlier embodiment, the Probe Response frame in this embodiment is delivered directly from the neighbor AP to the mobile station over the operation channel of the AP. Thus, availability of AP is confirmed through actual frame exchange.

According to yet another embodiment, a CF-pollable mobile station is interested in a specific neighboring AP and wants to authenticated. Since the mobile station is allowed to be authenticated with multiple APs at the same time, it may choose to be authenticated with whichever APs are found by the scanning. This allows possible subsequent handoff procedures to be expedited. The mobile station has the basic information to specify an AP, such as the BSSID and operation channel of the AP and includes this information in the Probe Request for Proxy frame to specify the AP to be examined. In this embodiment, the mobile station further requests CF-Poll from the specified AP. If the specified AP has PCF that is for polling as well as delivery, and if its polling schedules permits, the specified AP shall respond by sending on its operation channel a Probe Response and CF-Poll frame to the mobile station. Thus the mobile station can immediately proceed to the step of authentication by sending an Authentication and CF-Ack frame. Since the mobile station can fast proceed to the authentication step, scanning and authentication overhead is reduced and the fast handoff is facilitated.

As in the earlier embodiments, the mobile station in this embodiment does neither have to move to the channel to be examined nor have to send Probe Request frame on that channel. This enables active scan and authentication to be initiated even when the neighboring AP is operating in PCF with long CFP. In this embodiment, the Probe Response frame and Authentication frames are delivered directly between the neighbor AP and the mobile station over the operation channel of the neighboring AP. Thus, availability of AP is confirmed through actual frame exchange. Note that the mobile station can send frames to current AP using either DCF or PCF since it is already associated (in contrast, the mobile station cannot send frames to neighbor AP operating in PCF since it is not yet associated with the neighboring AP). This embodiment is basically for investigating the availability and the characteristics of a specific neighbor AP, but the mobile station also has the intention to authenticate with the neighboring AP. So the CF-Poll as well as the BSSID of the AP is specified in the frame body of the Probe Request for Proxy frame.

With some embodiments, the scanning method used in by explicit indication in the header of the Probe Request for Proxy frame. However, in other embodiments, the explicit indication or notification is within predetermined fields in the frame body of an action frame.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Embodiments of the present invention and their advantages are best understood by referring to the detailed description

DETAILED DESCRIPTION

According to one aspect of the present invention, an active scanning method in a wireless network uses inter-AP (Access Point) communication for determining available access points. In the scanning method, a mobile station sends a Probe Request for Proxy frame to the current AP serving the mobile station. In response to the Probe Request for Proxy frame, the current AP send Proxy Probe Request packet to the appropriate APs. In response to the Proxy Probe Request packet, the neighbor APs send a Probe Response frame to the mobile station on its operating channel. Since the mobile station moves to the channel being examined after sending the Probe Request for Proxy frame, the mobile station receives the Probe Response frame if the mobile station is in the coverage area of the neighbor AP. The content of Probe Response frame provides the mobile station with the information to be used in handoff decision and network join procedures.

Figure 1:
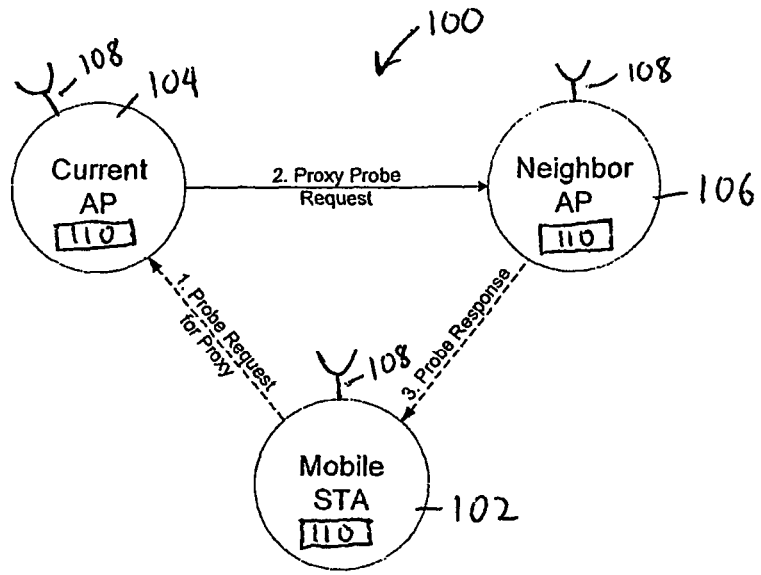
FIG. 1 is a block diagram of a wireless network according to one embodiment.

FIG. 1 is a block diagram of a network 100 according to one embodiment of the present invention. Network 100 includes a mobile station 102, a current AP 104 in communication with mobile station 102, and a neighboring AP 106. The mobile stations can be any device that can function within the 802.11 protocol, e.g., with physical layer (PHY) interfaces to the wireless medium and Media Access Control (MAC) that utilizes Carrier Sense Multiple Access with Collision Avoidance (CSMA/CA) protocol. Examples of suitable devices include laptop PCs and handheld devices, such as PDAs. These devices can be mobile, portable, or stationary. Network 100 can be an 802.11 conformant network, which typically includes a plurality of Basic Service Sets (BSSs), with each BSS having multiple wireless stations and an AP. Mobile station 102 and APs 104 and 106 each include an antenna 108 for transmitting and receiving frames or packets, as will be discussed below, and a processor 110 for processing the received information and preparing outbound frames or packets for transmission. Antennas 108 can be different, as is known, for mobile stations and APs. Further, separate receiving and transmitting antennas may be used instead of a single antenna 108 for both receiving and transmitting. Antenna 108 can be part of a transmitter, receiver, or transceiver.

Within network 100, mobile station 102 sends a Probe Request for Proxy frame to current AP 104, for each channel, to find available neighboring APs, such as AP 106, to learn their characteristics. In response to this frame, current AP 104 sends a Proxy Probe Request packet to the all APs in the Distribution System (DS). In other embodiments, the packet is sent only to the APs operating on the particular channel. Transmission between APs, such as between current AP 104 and neighboring AP 106, utilizes IAPP (Inter-AP Protocol), which is being standardized in the IEEE 802.11 TGf task group, details of which can be found in IEEE Std 802f/D5.0, "Draft Recommended Practice for Multi-Vendor Access Point Interoperability via an Inter-Access Point Protocol Across Distribution Systems Supporting IEEE 802.11 Operation", January 2003, incorporated by reference in its entirety.

IAPP specifies the information to be exchanged between APs amongst themselves and higher layer management entities to support the 802.11 DS functions. IAPP will allow APs to interoperate on a common DS, using the Transmission Control Protocol over IP (TCP/IP) or User Datagram Protocol over IP (UDP/IP) to carry IAPP packets between APs. An IAPP packet is carried in the TCP or UDP protocols over IP. Other communication schemes may also be used for transmission of packets between APs.

In response to a Proxy Probe Request packet sent by current AP 104, APs in the DS operating on the channel send a Probe Response frame to the mobile station on its operating channel. FIG. 1 shows only neighboring AP 106 sending the Probe Response frame for clarity, although mobile station 102 may receive Probe Response frames from many different APs. After sending the Probe Request for Proxy frame, mobile station 102 moves to the channel being examined. The receipt of Probe Response frame from an AP, such as neighboring AP 106, teaches the mobile station that it is in the coverage area of the AP and thus the AP is available. The content of the Probe Response frame, as will be discussed below, provides the mobile station with the information to be used in handoff decision and network joining procedures.

Figure 2:
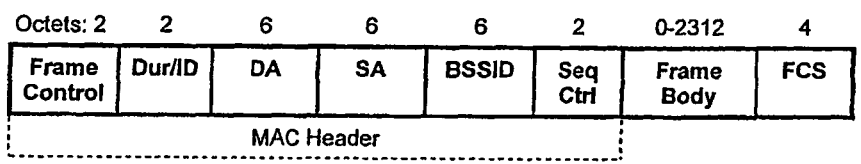
FIG. 2 shows the format of a management frame according to one embodiment.

The Probe Request for Proxy frame sent by mobile station 102 is, in embodiment, a management frame 200 whose frame format is as shown in FIG. 2, with the frame body comprising the fields shown in Table 1 below.

TABLE 1

| Order | Information |
| --- | --- |
| 1 | Channel |
| 2 | BSSID |
| 3 | SSID |
| 4 | MAC address |
| 5 | Capability information |
| 6 | Supported rates |

The Probe Request for Proxy frame has fields as shown in Table 2 according to one embodiment.

TABLE 2

| | Field | Value |
| --- | --- | --- |
| MAC header | DA | MAC address of current AP |
| | SA | MAC address of mobile station |
| | Current BSSID | MAC address of current AP |
| Frame body | Channel | Channel to be examined |
| | Neighbor BSSID | Broadcast BSSID |
| | Neighbor SSID | Broadcast SSID or SSID of neighbor AP or APs |
| | MAC address | MAC address of mobile station |
| | Capability information | CF-Pollable & CF-Poll Request in Type 1, 2, or 4 given in Table 3 below |
| MAC header/Frame body | Others | Determined as in the Probe Request frame |

TABLE 3

| Type | CF-Pollable | CF-Poll Request | Meaning |
| --- | --- | --- | --- |
| 1 | 0 | 0 | station is not CF-Pollable |
| 2 | 0 | 1 | station is CF-Pollable, not requesting to be placed on the CF-Polling list |

TABLE 3-continued

| Type | CF-Pollable | CF-Poll Request | Meaning |
|---|---|---|---|
| 3 | 1 | 0 | station is CF-Pollable, requesting to be placed on the CF-Polling list |
| 4 | 1 | 1 | station is CF-Pollable, requesting never to be polled |

A station that is able to respond to CF-Polls is referred to as being CF-Pollable and may request to be polled by an active PCF. When polled by the AP, a CF-Pollable station may transmit only one frame and may "piggyback" the acknowledgment of a frame received from the AP using particular data frame subtypes with CF-Ack. If the addressed recipient of a CF (Contention Free) transmission is not CF-Pollable, that station acknowledges the transmission using DCF acknowledgment rules.

The body of a Probe Request frame has two fields: the SSID (Service Set Identifier) and the rates supported by the mobile station. APs that receive Probe Requests use the information to determine whether the station can join the network. In one embodiment, the mobile station must support all the data rates required by the AP and must want to join any network identified by the SSID. Generally, type bits (B2, B3) and subtype bits (B4-B7) of the frame control field are used for identifying the frame. Any reserved type and subtype bits pair in Table 4 below can be assigned to a Probe Request for Proxy frame. For example type bits of 00 and subtype bits of 1110 can be assigned to Probe Request for Proxy frame.

TABLE 4

| Type Value B3 B2 | Type description | Subtype value B7 B6 B5 B4 | Subtype description |
|---|---|---|---|
| 00 | Management | 0100 | Probe Request |
| 00 | Management | 0101 | Probe Response |
| 00 | Management | 1000 | Beacon |
| 00 | Management | 1101 | Action |
| 00 | Management | 1110-1111 | Reserved |
| 01 | Control | 1101 | Acknowledgement (ACK) |

Figure 3:
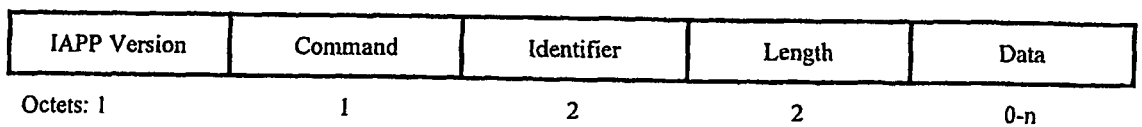
FIG. 3 shows the format of an IAPP packet according to one embodiment.

As discussed above, upon receipt of a Probe Request for Proxy frame, current AP sends a Proxy Probe Request packet to neighboring APs. In one embodiment, the Proxy Probe Request packet is an IAPP packet 300, as shown in FIG. 3, with the same information for the data fields as the Probe Request frame, shown in Table 1 above. The Proxy Probe Request packet is transferred using UDP or TCP/IP protocol, according to one embodiment. UDP/IP may be desirable if the packet is multicast on the entire DS. In one embodiment, Proxy Probe Request packet has the fields filled in accordance with Table 5.

TABLE 5

| | Field | Value |
|---|---|---|
| TCP/UDP header | Port | 3517 |
| IP header | Destination address | Multicast address (224.0.1.178) or IP addresses of individual APs |
| | Source address | IP address of current AP |

TABLE 5-continued

| | Field | Value |
|---|---|---|
| IAPP | Command | 7 (as in Table 6 below) |
| | Data | Copied from the frame body of Probe Request for Proxy frame |

TABLE 6

| Value | Command |
|---|---|
| 0 | ADD-notify |
| 1 | MOVE-notify |
| 2 | MOVE-response |
| 3 | Send-Security-Block |
| 4 | ACK-Security-Block |
| 5 | CACHE-notify |
| 6 | CACHE-response |
| 7 | Proxy-Probe-Request |
| 8-255 | Reserved |

After receiving the Proxy Probe Request, a neighboring AP 106 transmits a Probe Response frame to mobile station 102. This frame, in one embodiment, is a management frame whose frame format is as shown in FIG. 2, with the frame body comprising the fields as shown in Table 7 below.

TABLE 7

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Probe Response frames generated by stations using frequency hopping PHYs. |
| 7 | DS Parameter Set | The DS Parameter Set information element is present within Probe Response frames generated by stations using direct sequence PHYs. |
| 8 | CF Parameter Set | The CF Parameter Set information element is present within Beacon frames generated by APs with an active PCF. |

The allowed field values for the Probe Response frame, in one embodiment, are given in Table 8.

TABLE 8

| | Field | Value \ |
|---|---|---|
| MAC header | DA | MAC address of mobile station |
| | SA | MAC address of neighbor AP |
| | BSSID | MAC address of neighbor AP |
| MAC header/Frame body | Others | Determined as in the normal Probe Response frame |

Figure 4:
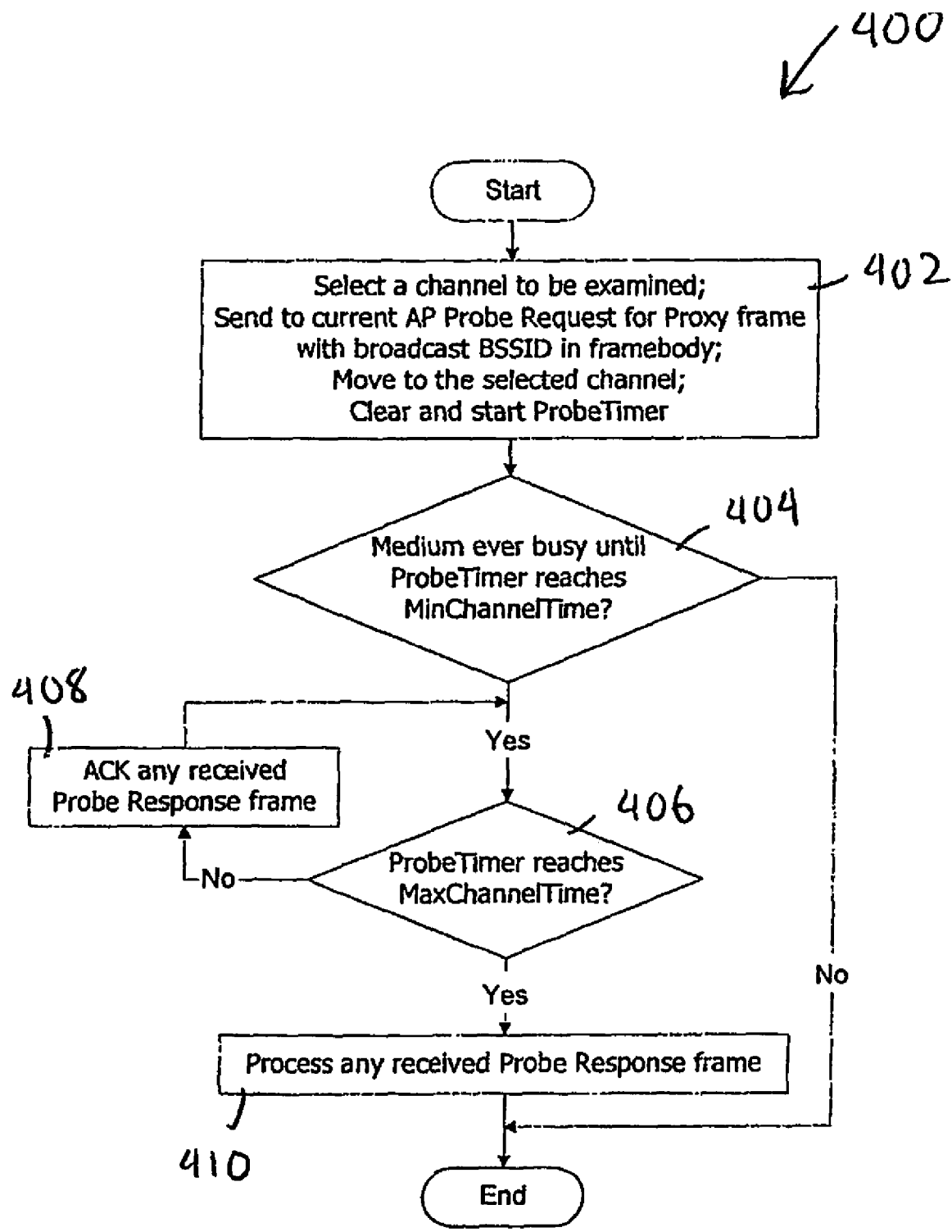
FIG. 4 is a flow chart showing actions of a mobile station according to one embodiment for the network of FIG. 1.

FIG. 4 is a flow chart 400 showing one embodiment of the present invention for a mobile station in proxy active scan. In step 402, mobile station 102 performs the following: 1)

Selects a channel to be examined; 2) Performs a medium access procedure (e.g., DCF or PCF) on the operation channel of current AP 104; 3) Sends a Probe Request for Proxy frame to current AP 104, with the Probe Request for Proxy frame having the format and field values as discussed above; 4) Moves to the channel to be examined; and 5) Clears and starts a ProbeTimer. If the medium has not been detected busy before the ProbeTimer reaches MinChannelTime, as determined in step 404, then the procedure ends (the channel is not operated by an AP in PCF). If the medium has been detected busy during the MinChannelTime, a determination, in step 406, is made whether the ProbeTimer has reached MaxChannelTime. Until MaxChannelTime has been reached, the mobile station acknowledges any received Probe Response frame, in step 408. Once MaxChannelTime has been reached, all received Probe Response frames are processed in step 410.

In one embodiment, MinChannelTime is set to a value long enough to detect a neighboring AP operating PCF on the channel, and MaxChannelTime is set long enough for the neighboring AP to respond to the Probe Request for Proxy frame. The round trip time between the current AP and the neighboring APs in IAPP as well as processing time and scheduling of current AP 104 and neighboring AP 106 should be considered. Note that mobile station 102 can send frames to current AP 104 using either DCF or PCF since the mobile station is already associated. In contrast, mobile station 102 cannot send frames to neighboring AP 106 operating in PCF since the mobile station is not yet associated with the neighbor AP. As discussed above, the body of the Probe Request frame contains rate and SSID data. By specifying the desired channel, all APs operating on a specific channel to be found. If mobile station is only interested in the APs having a specific SSID among those operating on the channel, on the other hand, the SSID can be further specified in the frame body.

Figure 5:
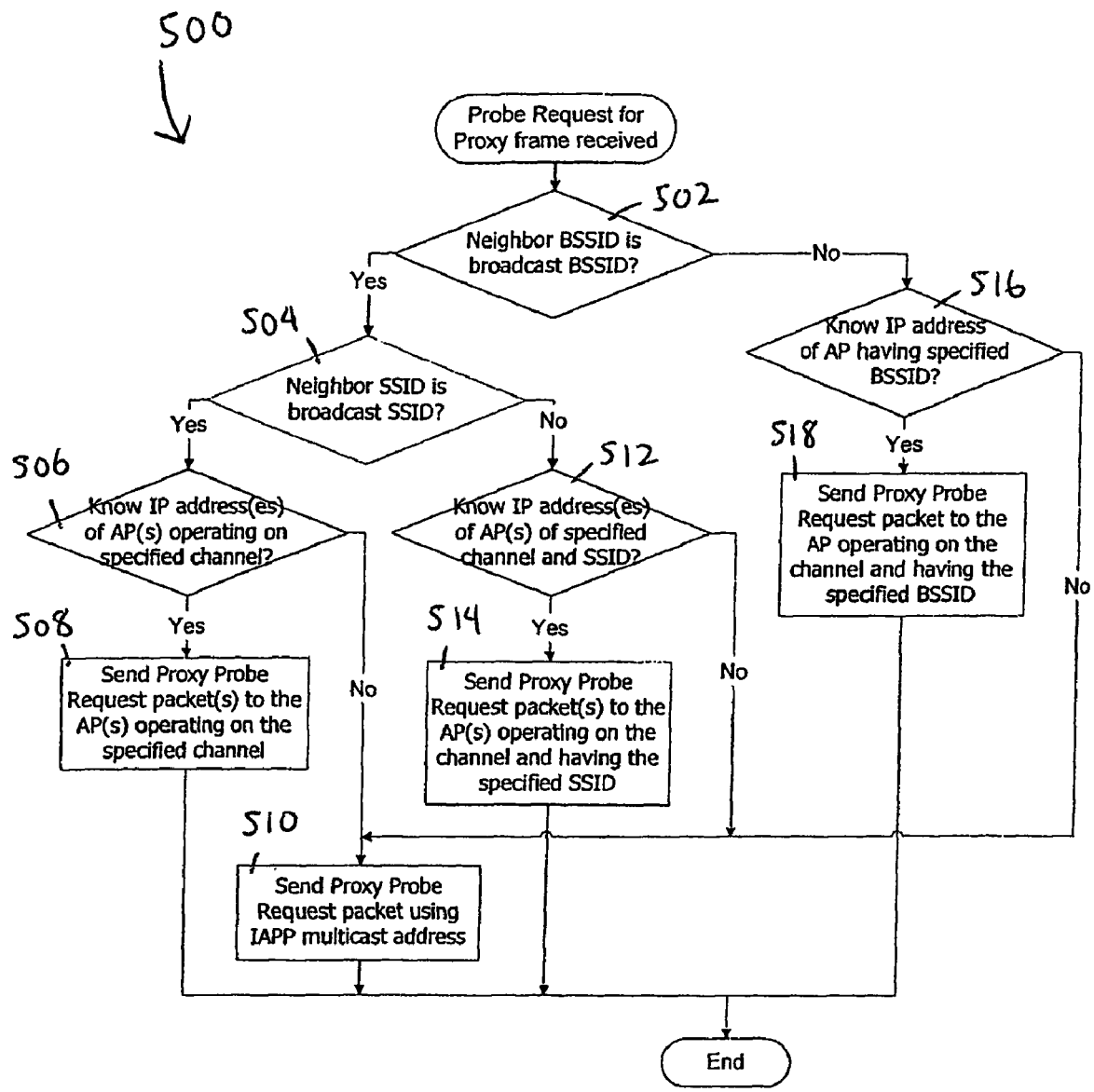
FIG. 5 is a flow chart showing actions of a current access point according to one embodiment for the network of FIG. 1.

FIG. 5 is a flow chart showing processing with current AP 104 after receiving a Probe Request for Proxy frame from mobile station 102. In step 502, current AP 104 determines, from the frame body of the Probe Request for Proxy frame, whether the neighbor BSSID (Basic Service Set Identifier) field has the broadcast BSSID, where the neighbor BSSID and neighbor SSID fields in the frame body of the Probe Request for Proxy frame are as shown in Table 2. If so, step 504 determines whether the neighbor SSID field in the frame body of the Probe Request for Proxy frame has the broadcast SSID. If the neighbor SSID has the broadcast SSID, step 506 determines whether the current AP knows the IP address or addresses of AP or APs operating on the channel specified by the channel field in the frame body of the Probe Request for Proxy frame. If the current AP knows the IP address or addresses of AP or APs, as determined in step 506, the current AP sends a Proxy Probe Request packet to these AP(s) operating on the specified channel at the IP address(es) in step 508. Transmission to specific IP address(es) can be performed with the TCP/IP protocol or any other suitable scheme. Otherwise (i.e., the current AP does not know the IP addresses of APs operating on the specified channel, as determined in step 506), the current AP sends a Proxy Probe Request packet to all APs in the DS using an IAPP multicast address in step 510.

If, as determined in step 504, the neighbor SSID is different than the broadcast SSID, the current AP determines, in step 512, whether the IP address or addresses of the AP or APs of the specified channel and SSID are known. If so, the current AP sends, in step 514, a Proxy Probe Request packet to the APs operating on the specified channel and having the specified SSID. Otherwise, current AP 104 sends the Proxy Probe Request packet using an IAPP multicast address in step 510.

Referring back to step 502, if the neighbor BSSID is different than the broadcast BSSID, the current AP determines, in step 516, whether the IP address of the AP having the specified BSSID is known. If the IP address is known, current AP 104 sends a Proxy Probe Request packet to the AP operating on the specified channel and having the specified BSSID in step 518. However, if the IP address is not known, as determined in step 516, current AP 104 transmits a Proxy Probe Request packet using an IAPP multicast address in step 510.

Thus, if the current AP 104 has the information on the IP address(es) of the AP(s) to be examined, then the current AP can send the Proxy Probe Request packet(s) to the specific AP(s) using, for example, TCP/IP protocol. Otherwise, the current AP can multicast the packet on the entire DS using IAPP multicast so that every AP in the DS can receive and respond if any of the APs in the DS satisfies the conditions posed by channel, BSSID, and SSID fields.

Figure 6:
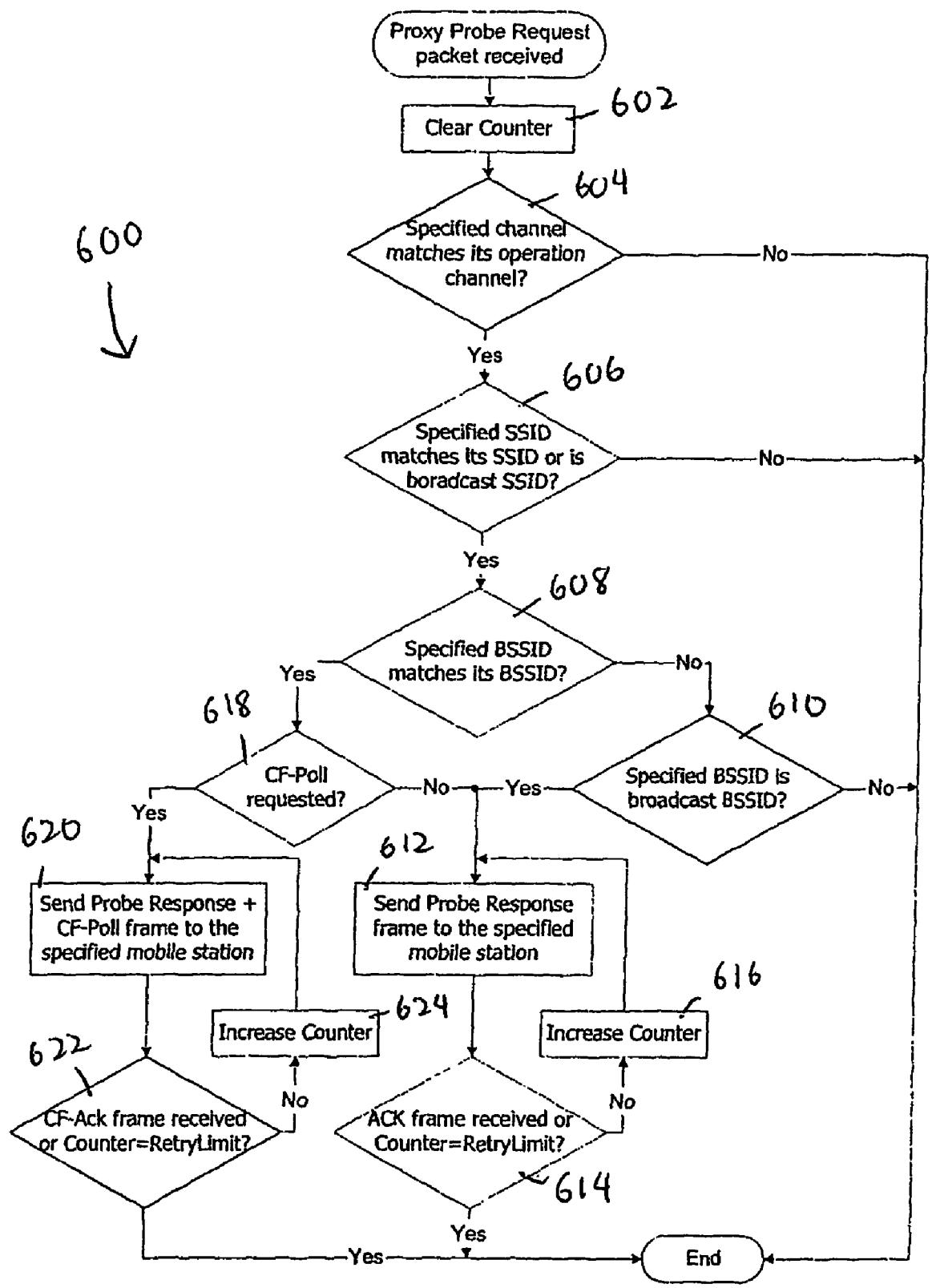
FIG. 6 is a flow chart showing actions of a neighboring access point according to one embodiment for the network of FIG. 1.

FIG. 6 is a flow chart 600 showing actions, according to one embodiment, for a neighboring AP 106 after the neighboring AP receives a Proxy Probe Request from current AP 104, either by unicast (using TCP/IP protocol) or by multicast. Upon reception of the Proxy Probe Request, neighboring AP 106, which can be any neighboring AP in the DS, resets its counter to zero in step 602. Neighboring AP 106 then determines, in step 604, whether the specified channel matches the neighboring AP's operation channel by using the channel field of the Proxy Probe Request packet (see Tables 1 and 2 above). If yes, neighboring AP 106 uses the SSID field of the Proxy Probe Request packet to determine whether the specified SSID matches its SSID or is the broadcast SSID, in step 606. If there is again a match, the AP determines, in step 608, whether the specified BSSID matches its own BSSID. If not, a determination is made in step 610 as to whether the specified SSID matches the broadcast SSID. If there is no match in the determinations made in steps 604, 606, or 610, the neighboring AP stops processing for that received Proxy Probe Request packet.

If the specified BSSID matches the broadcast BSSID, as determined in step 610, the neighboring AP sends a Probe Response frame to the current or specified mobile station in step 612. If an ACK frame from the specified mobile station has been received by the neighboring AP, indicating that the mobile station has received the Probe Response frame, such as in SIFS, or if the counter has reached RetryLimit, as determined in step 614, the processing for the current Proxy Probe Request packet is ended. However, if an ACK frame was not received and the counter has not reached RetryLimit, the counter is increased in step 616 and another Probe Response frame is sent in step 612. RetryLimit is an adjustable parameter in implementation. When RetryLimit is large, erroneous packet delivery failures can be reduced if the receiver is in the coverage area but frame retransmission can be just waste of wireless resource if the receiver is out of coverage area. Most MACs with retransmission capability have similar parameters. The value of the parameter can be same for all kinds of frame transmissions or can be different according to the types.

Returning to step 608, if the specified BSSID matches the BSSID of the neighboring AP, the AP determines if a CF-Poll (type 3) has been requested in step 618. If not, the AP sends a Probe Response frame to the mobile station in step 612 and processing continues as before. However, if a CF-Poll has been requested, the AP transmits a Probe Response with CF-Poll frame to the specified mobile station in step 620. If a CF-ACK frame is received by the AP, indicating receipt by the mobile station, or the counter has reached RetryLimit, as determined in step 622, the process ends for the current Proxy Probe Request packet. However, if a CF-ACK frame was not received and the counter has not reached RetryLimit, the counter is increased in step 624 and the AP sends another Probe Response and CF-Poll frame are sent in step 620. Processing then continues until either a CF-ACK frame is received or the counter has reached RetryLimit.

The frame format and the field values in the Probe Response frame are basically the same as in conventional active scanning. A neighboring AP responds to a Proxy Probe Request packet by sending Probe Response frame to the mobile station only when both the neighboring AP and the mobile station have the same operating channel, BSSID, and SSID. This allows the current AP to multicast Proxy Probe Request frames on the entire DS when it has no information on the IP address of the APs which satisfies the condition posed by the three fields.

It should be noted that even when the neighboring AP is operating PCF, the neighboring AP can send frames to the mobile station that is not yet associated. However, because the non-associated mobile station is not on the AP's polling list, the non-associated AP cannot generally send frames to the AP. Thus, the Probe Response frame is transmitted by the neighboring AP until an ACK is returned from the mobile station or the RetryLimit is reached. Consequently, even when the mobile station moves to the operation channel of the AP later than the first transmission of the Probe Response frame, the mobile station can receive the retransmitted Probe Response frame. This eliminates the burden of synchronizing the mobile station's channel tuning activity and the neighbor AP's Probe Response frame.

Referring back to FIG. 1, according to another embodiment of the present invention, mobile station 102 sends information about a specific neighboring AP in the Probe Request for Proxy frame to its current AP 104. The information includes the BSSID and operation channel of the neighboring AP. The active scan procedure is similar to that of the embodiment discussed above. However, because the Probe Request for Proxy frame contains information for a specific neighboring AP, only the specified AP shall respond by sending on its operation channel a Probe Response frame to the mobile station.

The format of Probe Request for Proxy frame is the same as described above in FIG. 2 and Table 1. According to one embodiment, the frame has the fields filled in accordance with Table 9 below. Values in the field that that are changed from those of Table 2 are shown in bold.

TABLE 9

| | Field | Value |
|---|---|---|
| MAC header | DA | MAC address of current AP |
| | SA | MAC address of mobile station |
| | Current BSSID | MAC address of current AP |
| Frame body | Channel | Operation channel of neighbor AP to be examined |
| | Neighbor BSSID | MAC address of neighbor AP to be examined |
| | Neighbor SSID | Broadcast SSID or SSID of neighbor AP to be examined |
| | MAC address | MAC address of mobile station |

TABLE 9-continued

| | Field | Value |
|---|---|---|
| | Capability information | CF-Pollable & CF-Poll Request in Type 1, 2, or 4 |
| MAC header/Frame body | Others | Determined as in the Probe Request frame |

As seen from Table 9, the Probe Request frame sent by mobile station 102 includes the operating channel, BSSID, and SSID information for the selected neighboring AP.

Once the Probe Request frame is received by current AP 104, it transmits a Proxy Probe Request packet. The format is the same as in the embodiment described above in FIG. 3 and Table 1. The Proxy Probe Request packet is transferred using UDP or TCP/IP protocol, in one embodiment. TCP/IP provides the capability of retransmission if the IP address of the specified AP is known. Table 10 below shows fields for the Proxy Probe Request packet according to one embodiment, with the field values changed from Table 5 shown in bold.

TABLE 10

| | Field | Value |
|---|---|---|
| TCP/UDP header | Port | 3517 |
| IP header | Destination address | Multicast address (224.0.1.178) or IP address of the specific neighbor AP specified in the Probe Request for Proxy frame |
| | Source address | IP address of current AP |
| IAPP | Command | 7 (as in Table 6) |
| | Data | Copied from the frame body of Probe Request for Proxy frame |

Upon receipt of the Proxy Probe Request, the specified neighboring AP transmits a Probe Response, where the format and field values have the same format and values as in embodiment discussed above.

Figure 7:
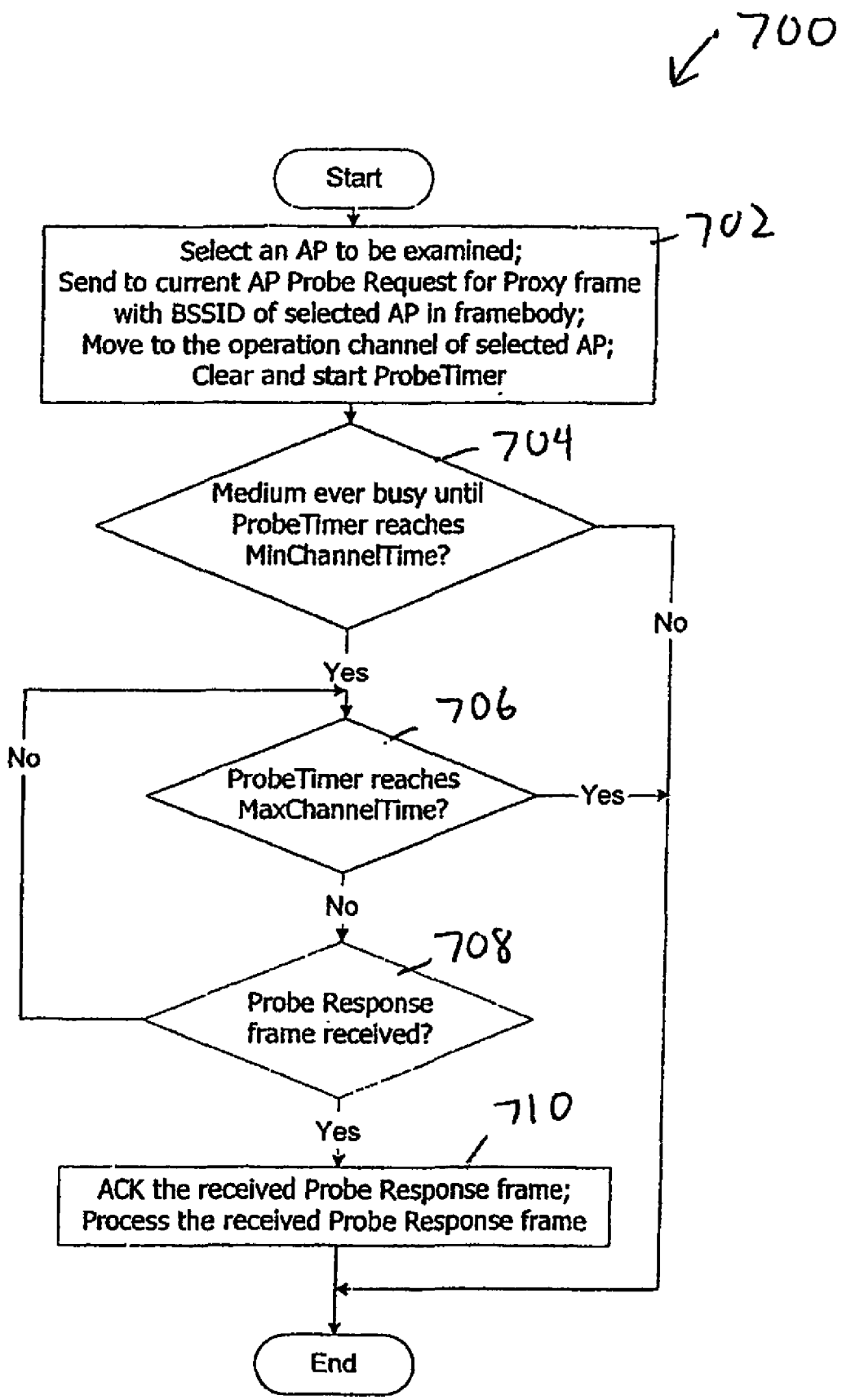
FIG. 7 is a flow chart showing actions of a mobile station according to one embodiment when the mobile station knows the basic information for a specific neighboring AP.

FIG. 7 is a flow chart 700 showing the steps performed by mobile station 102 according to one embodiment when the mobile station knows the basic information for a specific neighboring AP. In step 702, mobile station 102 performs the following: 1) selects an AP to be examined; 2) performs the medium access procedure (DCF or PCF) on the operation channel of the current AP; 3) sends a Probe Request for Proxy frame to current AP 104, with the Probe Request for Proxy frame having the format and field values as described above; 4) moves to the operation channel of the AP to be examined, and 5) clears and starts a ProbeTimer.

A determination is then made in step 704 as to whether the medium has been detected busy before ProbeTimer reaches MinChannelTime. If not, then the procedure ends (i.e., the channel is not operated by an AP in PCF). However, if the medium has been detected busy, the mobile station determines, in step 706, whether ProbeTimer has reached MaxChannelTime. If it has, the procedure ends. If ProbeTimer has not reached MaxChannelTime, a determination is made in step 708 whether a Probe Response frame was received by the mobile station. If not, ProbeTimer is checked again, in step 706. Thus, if the Probe Response frame is not received before ProbeTimer reaches MaxChannelTime, then the procedure ends (i.e., the channel is operated by an AP that is not reachable either by current AP through IAPP or by mobile station through air). If a Probe Response frame is received from the selected neighboring AP, the mobile station sends an ACK and processes the received Probe Response frame in step 710.

As in the embodiments of FIGS. 4-6, MinChannelTime is set to a value long enough to detect a neighboring AP operating PCF on the channel, and MaxChannelTime is set long enough for the neighboring AP to respond to the Probe Request for Proxy frame. Round trip time between the current AP and neighboring APs in IAPP as well as processing time and scheduling of current AP and neighboring AP should be considered. Similarly, the mobile station can send frames to the current AP using either DCF or PCF since the mobile station is already associated (in contrast, the mobile station cannot send frames to a neighboring AP operating in PCF since it is not yet associated with the neighbor AP).

Referring to FIG. 5, once the current AP receives the Probe Request for Proxy, the current AP uses the BSSID of the specified AP in the (neighbor) BSSID field of the frame body in the Probe Request for Proxy frame. Current AP 104 determines if the IP address is known for the AP having the specified BSSID and operating on the specified channel. If so, current AP 104 transmits a Proxy Probe Request packet to the IP address of the AP, such as by TCP/IP protocol. However, if the address is not known, current AP 104 multicasts the packet on the entire DS using IAPP multicast so that every AP in the DS can receive and respond if it satisfies the conditions posed by the channel, BSSID, and SSID fields.

Referring now to FIG. 6, once the specified neighboring AP receives a Proxy Probe Request packet from the current AP, the neighboring AP investigates the frame's channel, Neighbor BSSID, Neighbor SSID, capability information fields. If the BSSID specified in the BSSID field matches its own BSSID and CF-Poll is not requested (type 1, 2, or 4) in the capability information field, the neighboring AP uses the same procedure as described in FIG. 6.

As with the previous embodiment of FIGS. 4-6, even when the neighboring AP is operating PCF, it can send frames to the mobile station that is not yet associated. A Probe Response frame is transmitted until an ACK is returned from the mobile station or the RetryLimit is reached. Thus, even when the mobile station moves to the operation channel of the AP later than the first transmission of the Probe Response frame, it can receive the retransmitted Probe Response frame.

As a result, the mobile station advantageously does not have to stay on the channel after receiving a Probe Response frame and sending an ACK in response to the frame. Since the mobile station can fast return to the current communication channel, scanning overhead is reduced, and the fast handoff is facilitated. Further, as with the earlier embodiment, the mobile station neither has to move to the channel to be examined nor has to send a Probe Request frame on that channel. This enables active scan to be done even when the neighboring AP is operating in PCF with long CFP. Similarly, the Probe Response frame is delivered directly from the neighboring AP to the mobile station over the operation channel of the AP. Thus, the availability of the AP is confirmed through actual frame exchange.

Figure 8:
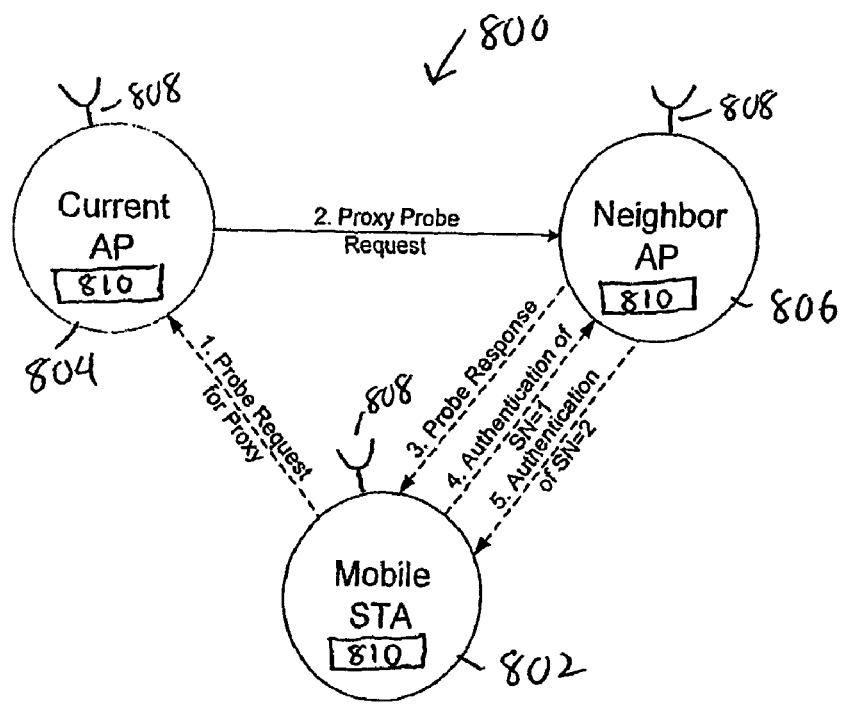
FIG. 8 is a block diagram of a wireless network, according to another embodiment, where the mobile station is CF-pollable and interested in a specific neighboring AP, with authentication by the APs.

FIG. 8 shows another embodiment of the present invention, in which a network 800 includes communication between a mobile station 802, a current AP 804, and a neighboring AP 806, as with FIG. 1. As with FIG. 1, the mobile station and the APs have antennas 808 for transmitting and receiving packets or frames, and a processor 810 for processing the receiving information and preparing outgoing packets or frames for transmission. Note also that although only one neighboring AP 106 (FIG. 1) or 806 (FIG. 8) is shown, the invention is not limited to only one, but can have multiple neighboring APs, as is obvious from the description contained herein. However, in this embodiment, mobile station 802 is CF-pollable and is interested in a specific neighboring AP, with authentication by the APs. Since mobile station 802 is allowed to be authenticated with multiple APs at the same time, it may choose to be authenticated with whichever APs found by the scanning. This is to expedite possible handoff procedures which may happen later. The active scanning by mobile station 802 is similar to that of the embodiment described above with reference to FIG. 7.

The format of the Probe Request for Proxy frame transmitted by mobile station 802 is the same as described above with reference to FIG. 2 and Table 1. Table 11 below shows fields for the Probe Request for Proxy frame, according to one embodiment, where the field values differing from Table 9 are shown in bold.

TABLE 11

|  | Field | Value |
| --- | --- | --- |
| MAC header | DA | MAC address of current AP |
|  | SA | MAC address of mobile station |
|  | Current BSSID | MAC address of current AP |
| Frame body | Channel | Operation channel of neighbor AP to be examined |
|  | Neighbor BSSID | MAC address of neighbor AP to be examined |
|  | Neighbor SSID | Broadcast SSID or SSID of neighbor AP to be examined |
|  | MAC address | MAC address of mobile station |
|  | Capability information | CF-Pollable & CF-Poll Request in Type 3 |
| MAC header/Frame body | Others | Determined as in the Probe Request frame |

The format and field values for the Proxy Probe Request packet sent by current AP 804 and for the Probe Response frame sent by neighboring AP 806 are the same as those described above for the embodiment of FIG. 7.

Figure 9:
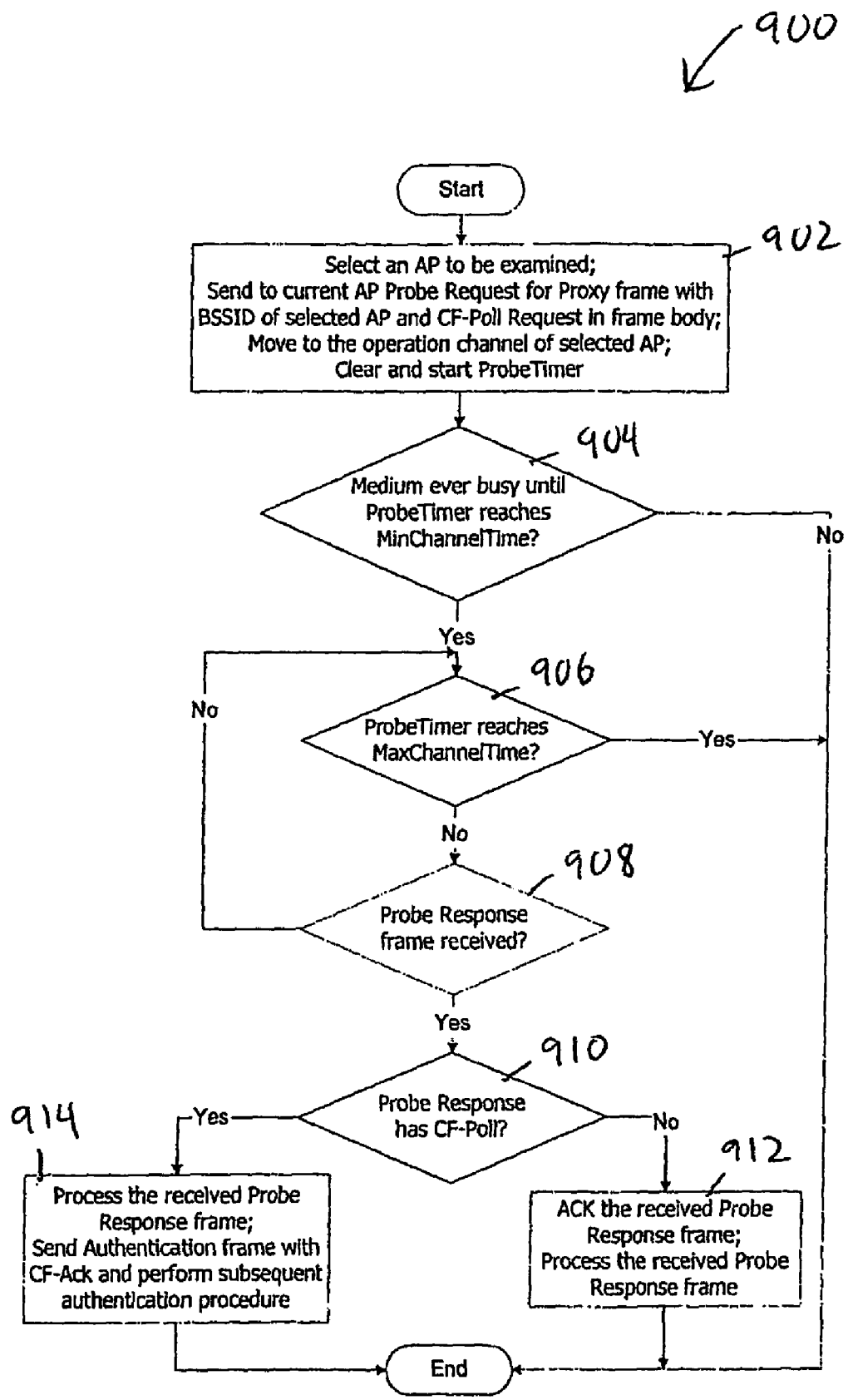
FIG. 9 is a flow chart showing actions of a mobile station according to one embodiment for the network of FIG. 8.

FIG. 9 is a flowchart 900 showing actions of mobile station 802 according to one embodiment. In step 902, mobile station 802 performs the following: 1) selects an AP to be examined; 2) performs the medium access procedure (DCF or PCF) on the operation channel of the current AP; 3) sends a Probe Request for Proxy frame to current AP 804, with the Probe Request for Proxy frame having the format and field values described above; 4) moves to the operation channel of the AP to be examined; and 5) clears and starts a ProbeTimer. Next, in step 904, mobile station 802 determines if the medium has been detected busy before the ProbeTimer reaches MinChannelTime. If not, then the procedure ends (i.e., the channel is not operated by an AP in PCF).

However, if the medium has been detected busy, mobile station 802 determines, in steps 906 and 908, whether the ProbeTimer has reached MaxChannelTime before receiving a Probe Response frame. If so, then the procedure ends (i.e., the channel is operated by an AP that is not reachable either by current AP through IAPP or by mobile station through air). If a Probe Response frame is received before the ProbeTimer reaches MaxChannelTime, the received frame is processed to determine if the frame has CF-Poll, in step 910. If the frame does not have CF-Poll, mobile station 802 sends an ACK for the received Probe Response frame and processes the Probe Response frame in step 912. However, if the Probe Response frame has CF-Poll, mobile station 802, in step 914, processes the Probe Response frame, sends an Authentication frame with a CF-Ack, and performs a subsequent authentication procedure.

As in the above described embodiments, MinChannelTime and MaxChannelTime are set to the appropriate values. Likewise, the mobile station can send frames to the current AP using either DCF or PCF since the mobile station is already associated (in contrast, the mobile station cannot send frames to neighbor AP operating in PCF since it is not yet associated with the neighbor AP). As with the embodiment of FIG. 7, this embodiment is basically for investigating the availability and the characteristics of a specific neighbor AP, but the mobile station in this embodiment also has the intention to authenticate with the neighbor AP. So the CF-Poll, as well as the BSSID of the AP, is specified in the frame body of the Probe Request for Proxy frame.

The procedure of current AP 804 in this embodiment is the same as with the current AP in the embodiment described above with reference to FIG. 7.

The procedure of neighboring AP 806 is now described with reference to FIG. 6, with some distinctions, as will be noted. After receiving a Proxy Probe Request packet from current AP 804, neighboring AP 806 investigates the packet frame's channel, Neighbor BSSID, Neighbor SSID, and capability information fields. The neighboring AP responds to the Proxy Probe Request only when the BSSID specified in the BSSID field matches the BSSID of the neighboring AP (see, e.g., step 608). If CF-Poll is requested in the capability information field (type 3) of the Proxy Probe Request packet (see, e.g., step 618), a change from FIG. 6 is that the neighboring AP next determines whether it has PCF that is for polling, and if its polling schedule permits the CF-Poll to the mobile station.

In doing so, the effect on QoS (Quality of Service) of other mobile stations will also be considered. Specifically, CF-Poll may be allowed only when the consecutive frame transmissions allowed by CF-Poll do not deteriorate QoS of other mobile stations. If the CF-Poll is permissible as a result of the consideration, the neighboring AP responds by sending on its operation channel a Probe Response with CF-Poll frame to the mobile station (see, e.g., step 620). If the CF-Poll is not permissible, the neighboring AP responds by sending simply a Probe Response (that is, without CF-Poll). If the Probe Response with CF-Poll frame is sent, mobile station 802 can immediately proceed to the step of authentication by sending an Authentication with CF-Ack frame back to neighboring AP 806. Since the mobile station can fast proceed to the authentication step, scanning and authentication overhead is reduced, and the fast handoff is facilitated.

It should be noted that the CF-Poll with Probe Response transmission is done only in response to a Proxy Probe Request and is temporary in nature. Otherwise, the neighboring AP will continue to poll the mobile station even after it finishes the scanning procedure and returns to its original channel, which leads to significant waste of bandwidth for the neighboring AP. In these aspects, the CF-Poll with Probe Response is different from the ordinary CF-Poll that is done for CF-Pollable mobile stations associated with the AP.

Further, as with the embodiments of FIGS. 4-6 and 7, the mobile station in this embodiment neither has to move to the channel to be examined nor has to send a Probe Request frame on that channel. This enables active scan and authentication to be initiated even when the neighboring AP is operating in PCF with long CFP. In this embodiment, the Probe Response frame and Authentication frames are delivered directly between the neighboring AP and the mobile station over the operation channel of the neighboring AP. As a result, availability of the AP is confirmed through actual frame exchange.

In another embodiment of the invention, the mobile station identifies, from an action frame, the type of scanning method used. As distinguished from the earlier embodiments, where scanning methods are indicated in the header of Probe Request for Proxy frame, this embodiment uses predetermined fields in the frame body of the action frame (type bits of 00 and subtype bits of 1101 in frame control field) for explicit notification of the scanning method.

Figure 10A:
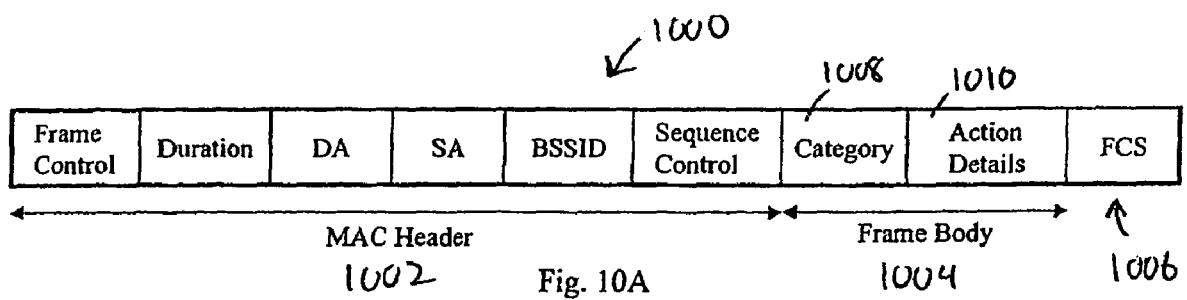
FIGS. 10A and 10B show formats of an action frame and an action frame body, respectively, according to one embodiment.
Figure 10B:
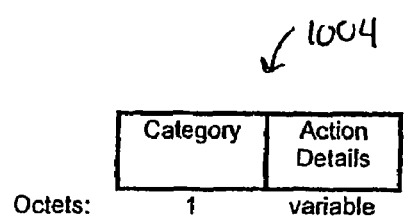

An action frame 1000, shown in FIG. 10A, is a type of management frame, like a Probe Request or Probe Response frame. Action frame 1000 includes a MAC header portion 1002, a frame body portion 1004, and a Frame Check Sequence (FCS) 1006. The MAC header and FCS fields are conventional and well known. The frame body for an action frame includes a Category field 1008 and an Action Details field 1010. The action frame provides a mechanism for specifying extended management actions, details of which can be found in IEEE Std 802.11k/D0.1, "Specification for Radio Resource Measurement (Draft Supplement to IEEE Std 802.11, 1999 Edition)", March 2003, which is incorporated by reference in its entirety. The format of action frame body 1004 is shown in FIG. 10B, where the Category field is one octet and the Action Details field is a variable number N octets. The Category field is set to one of the non-reserved values shown in Table 12 below.

TABLE 12

| Name | Value |
|---|---|
| Reserved | 0 |
| QoS management | 1 |
| DLP | 2 |
| Radio measurement | 3 |
| Reserved | 4-127 |
| Error | 128-255 |

In this embodiment, any reserved category values can be used to explicitly indicate the specific proxy active scanning to be used. For example, category value of 4 is assigned to indicate the proxy active scanning according to the embodiment of FIGS. 4-6, while category value of 2 is assigned to indicate the active scanning of the embodiment of FIG. 7.

The Action Details field contains the details of the action. The details of the actions allowed in each category are described in "Specification for Radio Resource Measurement (Draft Supplement to IEEE Std 802.11, 1999 Edition)", referenced above. In the radio measurement category, an action field, in the octet field immediately after the category field, differentiates the specific radio measurement actions. The action field values are shown in Table 13 below, according to one embodiment.

TABLE 13

| Action field value | Description |
|---|---|
| 0 | Measurement Request |
| 1 | Measurement Report |
| 2-255 | Reserved |

Any reserved action field values of radio measurement category (category value of 3) can be used to explicitly indicate the specific active scanning to be used. For example, action field value of 4 is assigned to indicate the active scanning according to the embodiment of FIG. 7, while action field value of 5 is assigned to indicate the active scanning of the embodiment of FIGS. 8 and 9. This embodiment shows variations in the means for indicating probe request for proxy frame. It can be done by an indication either in the header or in the frame body. Indication in the header might be more efficient in view of processing but would require more changes from the existing implementation.

Embodiments described above illustrate but do not limit the invention. It should also be understood that numerous modifications and variations are possible in accordance with the principles of the present invention. For example, although this invention is explained with respect to active scan, authentication and (re-)association will have the same problem as in the active scanning if the interested AP is operating PCF. So, the use of the current AP as a proxy to deliver the request to initiate authentication and (re-)association will similarly solve the problem. These kinds of variations are also within the scope of the invention. Further, although a specific format is shown for a Probe Request for Proxy frame and a Proxy Probe Request packet, the present invention is not constrained by the specific frame and packet format, as other suitable frame and packet formats may be used. Also, the above description is with reference to IEEE 802.11; however, the invention can be applied to other types of wireless communication systems. Accordingly, the scope of the invention is defined only by the following claims. Although the embodiments are illustrated with reference to the case where current AP and neighboring APs are in the same DS, the invention can be easily extended to more general cases where the APs are different DSs.

What is claimed is:

1. A method of wireless communication, comprising:
receiving a management request for proxy packet from a mobile station to a current access point (AP), wherein the management request for proxy packet specifies a channel and a broadcast SSID or BSSID of a neighboring AP in a distributed system;
in response to receipt of the management request for proxy packet, transmitting a proxy management request packet from the current AP to all APs in the distributed system (DS); and
in response to receipt of the proxy management request packet, transmitting a management response packet from each AP in the DS operating on the specified channel to the mobile station.

2. The method of claim 1, wherein transmitting the proxy management request packet is by Inter-AP Protocol (IAPP).

3. The method of claim 1, wherein transmitting the proxy management request packet is by Transport Control Protocol (TCP)/Internet Protocol (IP).

4. The method of claim 3, further comprising identifying the IP address of the neighboring AP.

5. The method of claim 1, further comprising requiring the mobile station to communicate on the channel identified in the management request for proxy packet after transmitting the management request for proxy packet.

6. The method of claim 1, further comprising using the information in the management response packet to join the network comprising the neighboring AP.

7. The method of claim 1, wherein each AP in the distributed system operating on the specified channel transmits the management response packet on the channel identified in the management request for proxy packet.

8. The method of claim 1, wherein the neighboring AP is operating in Point Coordination Function (PCF).

9. The method of claim 1, wherein the management request for proxy packet is a Probe Request for proxy packet, the proxy management request packet is a proxy Probe Request packet, and the management response packet is a probe Response packet.

10. The method of claim 1, further comprising confirming the availability of the neighboring AP through a frame exchange.

11. The method of claim 1, wherein the proxy management request packet comprises a multicast address or an IP address for the neighboring AP.

12. The method of claim 1, wherein the management request for proxy packet further comprises a CF-Poll Request.

13. The method of claim 12, further comprising transmitting on the operating channel information for a CF-Poll from the neighboring AP to the mobile station.

14. The method of claim 13, further comprising authenticating by the mobile station upon receipt of the CF-Poll information.

15. The method of claim 14, wherein the authenticating comprises sending an authentication and CF-Ack frame from the mobile station to the neighboring AP.

16. The method of claim 1, wherein the mobile station neither has to move to the channel nor send a Probe Request frame on the channel so that active scanning can be initiated when the neighboring AP is operating in PCF and the network is in CFP.

17. The method of claim 1, further comprising communicating with at least one other neighboring AP from among the APs in the distributed system operating on the specified channel, wherein the mobile station can obtain information on all APs in the network and operating on the channel so that the mobile station can be confirmed through actual frame exchanges.

18. A method of wireless communication, comprising:
receiving a management request for proxy packet from a mobile station to a current access point (AP), wherein the management request for proxy packet specifies a channel and a broadcast SSID or BSSID of a neighboring AP in a distributed system;
in response to receipt of the management request for proxy packet, transmitting a proxy management request packet to all APs in the distributed system (DS) on the specified channel for which the current AP has no IP address information on and which match the broadcast SSID or BSSID; and
transmitting a management response packet from each AP receiving the proxy management request packet.

19. A wireless communication system, comprising:
a mobile station;
a current access point (AP) configured to receive a management request for proxy packet from the mobile station, the management request for proxy packet specifying a channel and a broadcast SSID or BSSID, and to transmit a proxy management request packet to all APs in a distributed system (DS), in response to the management request for proxy packet; and
a neighboring AP configured to receive the proxy management request packet and transmit a management response packet on the channel to the mobile station in response to the proxy management request packet.

20. The system of claim 19, wherein the mobile station neither has to move to the operating channel nor send a Probe Request frame on the channel so that active scanning can be initiated when the neighboring AP is operating in PCF and the system is in CFP.

21. The system of claim 19, further comprising at least a second neighboring AP, wherein the mobile station can obtain information on all APs in the system and operating on a channel so that the mobile station can be confirmed through actual frame exchanges.

22. A method of wireless communication at a mobile station between the mobile station and a neighboring access point (AP), comprising:
  transmitting a management request for proxy packet to a current AP, wherein the management request for proxy packet specifies a channel and a broadcast SSID or BSSID of the neighboring AP;
  receiving a management response packet from the neighboring AP, wherein the neighboring AP transmits the management response packet in response to a proxy management request packet received from the current AP, which sends the proxy management request packet to all APs in a distributed system (DS); and
  establishing a communication link with the neighboring AP based on information contained in the management response packet.

23. A method of wireless communication between a mobile station and a neighboring access point (AP), the mobile station being associated with a current access point, comprising:
  receiving, by the neighboring AP, a proxy management request packet from a current AP, wherein the proxy management request is sent to all APs on a channel in a distributed system (DS) from the current access point in response to a management request for proxy packet sent by the mobile station, the management request for proxy packet specifying the channel and a broadcast SSID or BSSID of the neighboring AP;
  transmitting a management response packet by the neighboring AP to the mobile station in response to the proxy management request packet; and
  establishing a communication channel between the neighboring AP and the mobile station based on infoiniation contained in the management response packet.

24. An access point (AP) for use in a wireless communication network, comprising:
  a receiver for receiving a management request for proxy packet from a mobile station, wherein the management request for proxy packet specifies a channel and a broadcast SSID or BSSID of a neighboring AP;
  a transmitter for transmitting a proxy management request packet to all APs in a distributed system (DS) such that at least one of the APs in the distributed system transmits a management response packet on the channel; and
  a processor for processing information from the management request for proxy packet and the proxy management request packet.

25. The access point of claim 24, wherein the transmitter and the receiver comprise a single transceiver.

26. The access point of claim 24, wherein the transmitter comprises a first antenna and the receiver comprises a second antenna.

27. The access point of claim 24, wherein the mobile station neither has to move to the operating channel nor send a Probe Request frame on the channel so that active scanning can be initiated when the neighboring AP is operating in PCF and the network is in CFP.

28. An access point (AP) for use in a wireless communication network, comprising:
  a receiver for receiving a proxy management request packet from a current AP, wherein the proxy management request is sent on a channel to all APs in a distributed system (DS) from the current AP in response to a management request for proxy packet sent by a mobile station that specifies the channel and a broadcast SSID or BSSID of the neighboring AP;
  a transmitter for transmitting a management response packet to a mobile station in response to the proxy management request packet; and
  a processor for processing information from the proxy management request packet and the management response packet.

29. The access point of claim 28, wherein the transmitter and the receiver comprise a single transceiver.

30. The access point of claim 28, wherein the transmitter comprises a first antenna and the receiver comprises a second antenna.

31. The access point of claim 28, wherein the mobile station neither has to move to the operating channel nor send a Probe Request frame on the channel so that active scanning can be initiated when the AP is operating in PCF and the network is in CFP.

* * * * *